Figure 3:
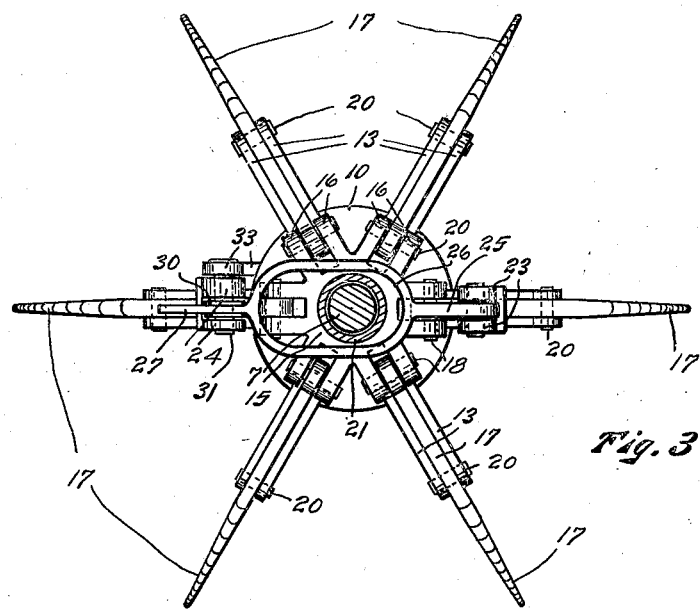
Figure 5:
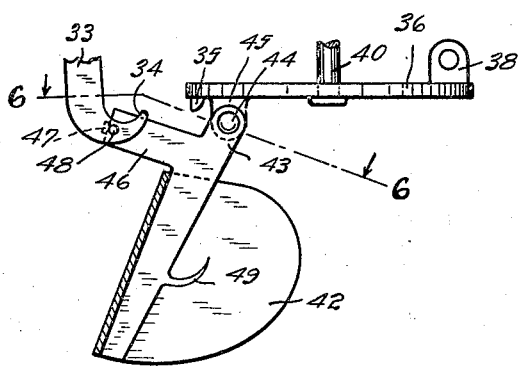
Figure 4:
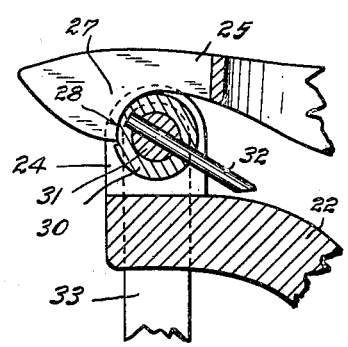
Figure 6:
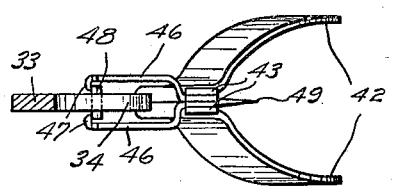

Dec. 26, 1922.
G. FRIESS ET AL.
TRAP.
FILED AUG. 6, 1921.
1,439,809.
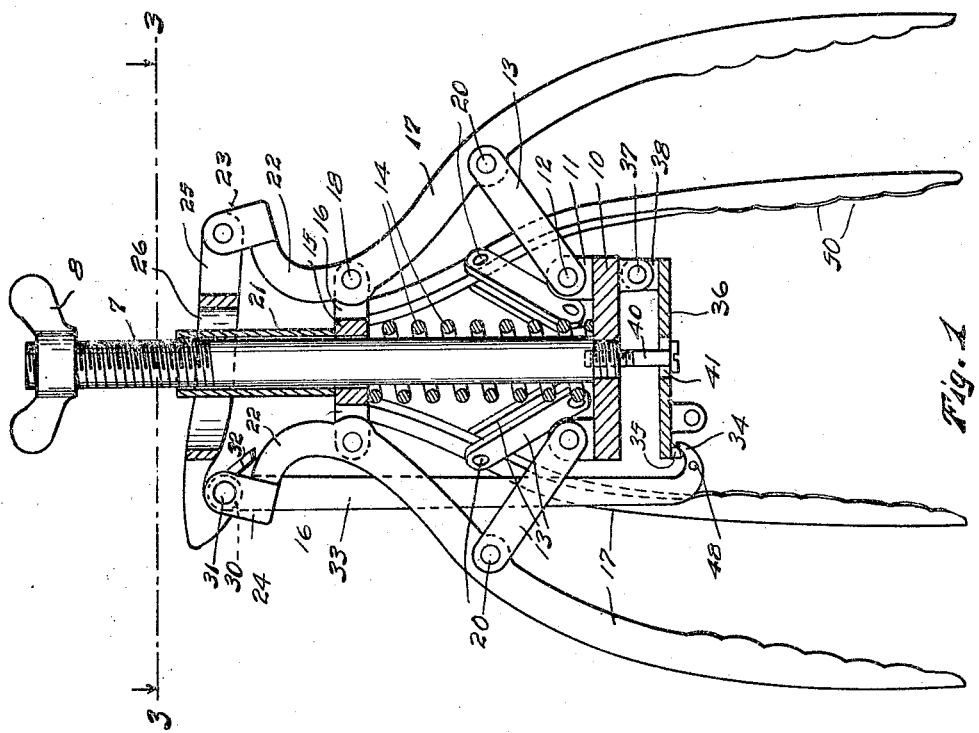
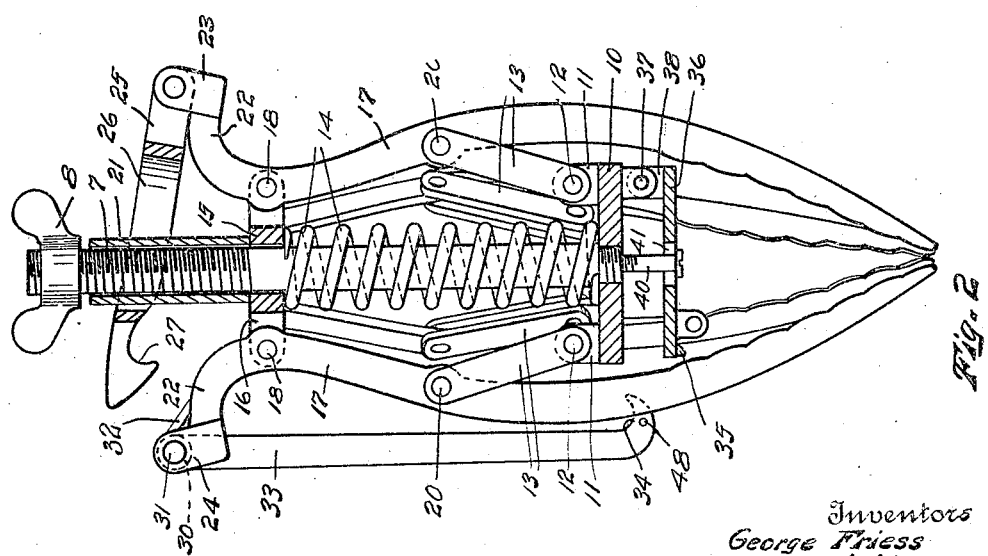
Inventors
George Friess
Robert Nass
By Their Attorney
Fred C. Matheny Patented Dec. 26, 1922.

1,439,809

UNITED STATES PATENT OFFICE.

GEORGE FRIESS AND ROBERT NASS, OF SEATTLE, WASHINGTON.

TRAP.

Application filed August 6, 1921. Serial No. 490,223.

*To all whom it may concern:*

Be it known that we, GEORGE FRIESS and ROBERT NASS, citizens of the United States, residing at Seattle, in the county of King and State of Washington, have invented a certain new and useful Improvement in Traps, of which the following is a specification.

This invention relates to improvements in traps for catching animals, fish, birds and the like and the object of this invention is to provide a trap that may be used in the open, above ground or that may be used for animals that burrow in the ground and that is constructed in such a manner that it will not fail to catch an animal by which it is tripped.

Another object is to provide a trap that is particularly well adapted for catching moles and that will operate in exactly the same manner, regardless of which side the trap is approached from.

A further object is to provide a trap having a plurality of radially arranged jaws or gripping arms that are adapted to be spread apart when the trap is set and to snap together on the central axis of the trap when the trap is sprung in such a manner that they will ordinarily catch an animal by the head and kill the animal instantly.

A further object is to provide a novel mechanical means for setting the trap, the said means being so constructed as to eliminate danger of injury to the hands during the trap setting operation.

A further object is to provide a trap comprising a plurality of jaw members arranged about an axially disposed shank or stem and connected by links with said stem in such a manner that the jaw members may be operated by a compression spring on the stem.

A further object is to provide novel trip mechanism that is strong in construction and yet is very delicate in operation and may be set so that it is very easily tripped and to further provide trip mechanism that may be used either with or without baiting, quickly removable attachments being applied to the said trip mechanism when it is desired to use a bait.

Still further objects are to provide a trap that is simple in construction, reliable in operation, easy to set, not liable to get out of order and not expensive to manufacture.

With the above and other objects in view as will be apparent from the following description, the invention consists in the novel construction, adaptation and combination of parts as will be more clearly hereinafter described and claimed.

In the accompanying drawings, Figure (1) is a view in vertical mid-section of a trap constructed in accordance with this invention, parts being shown in elevation and the jaws of the trap being shown in an open or set position. Figure (2) is a similar view showing the jaws of the trap in a closed position. Figure (3) is a view partly in plan and partly in section on broken line 3—3 of Figure (1). Figure (4) is an enlarged sectional detail illustrating parts of the set and trip mechanism. Figure (5) is a view partly in elevation and partly in cross section showing the trip mechanism that is attached when the trap is to be baited and Figure (6) is a view partly in plan and cross section, substantially on a broken line 6—6 of Figure (5).

Like reference numerals designate like parts throughout the several views.

Referring to the drawings, the numeral (7) designates a stem or post that is threaded on its upper end for the reception of a wing nut (8) and that is rigidly secured at its lower end to a disk or plate (10) whereon are provided six equidistantly spaced, upwardly projecting lugs (11) that are connected by pivot pins (12) with links (13).

Disposed on the post (7) and resting upon the disk (10) is a helical compression spring (14) whose upper end engages with the bottom side of a spider member (15) that is slidable on the post (7) and that is provided at six equidistantly spaced points with outwardly projecting pairs of lugs (16), to which trap jaws (17) are pivotally mounted by transverse pivot pins (18), the said trap jaws (17) being connected below the spider (15) by pivots (20) with the outer ends of the links (13) in such a manner that the compressive force of the spring (14) will tend to draw the respective pivots (12), (18) and (20) into alignment, thereby drawing the lower ends of the jaw members (17) together as shown in Figure (2).

Slidably mounted on the post (7) and resting upon the spider member (15) is a tube (21), with which the upper end of the wing nut (8) is arranged to engage so that when such wing nut is screwed downwardly on the post (7), the spider (15) and plate (10) will be moved toward each other against the pressure of the spring (14), thereby causing a toggle like action between the links (13) and the jaws (17) and causing the jaws to be spread outwardly into the position shown in Figure (1).

The set means for holding the jaws (17) in an open position is formed by providing two diametrically opposite jaws (17) with elongated upper ends (22) that project upwardly above the pivots (18) are curved outwardly as shown and that terminate in bifurcated lugs (23) and (24) on the respective ends.

Pivotally secured at one end to the lugs (23) is an arm (25), having an enlarged central portion (26), provided with an elongated opening that fits over the tube (21) and having at its other end a hook (27) that is adapted to hook over the slightly flattened side (28) of a substantially cylindrical member (30), see Figure (4) that is secured on a pin (31) that is journaled in the lugs (24). The amount that the pin (31) can turn in one direction is limited by a stop member (32) that is arranged to engage the upper surface of the end (22) of the jaw member and serve as a stop and that may also be used for securing the roller member (30) to the pivot pin (31).

The hook (27) is shaped so that when it is hooked over the roller (30) as shown in Figure (4), it will tend to turn the roller, but if the roller is held securely will not slide off. It will however, slide off as soon as the roller is released and permitted to turn even a slight amount, thereby releasing the jaws which are obviously held open by the arm (25) when it holds the upper ends (22) of the two oppositely disposed jaws together.

The outer part of the pin (31) is rigidly secured to a trip arm (33) that extends downwardly and is curved at its bottom end to form a hook (34) that is arranged to engage with a lug (35) on the bottom of a trip member (36) that is pivoted by means of a pin (37) and lugs (38) to the disk (10) and that is further supported by a screw (40) that passes through a slot (41) in the trip member and screws into the end of the post (7), the screw (40) serving as means for adjusting the position of the trip member (36), and as means for preventing the trip member from swinging.

If it is desired to use a bait with the trap, a bait holding device may be used, said bait holding device comprising a flaring bait shield (42) having an upward projecting lug (43) that is hinged by a pivot (44) to a lug (45) on the bottom of the trip member (36) and that has rearwardly projecting spaced apart arms (46), provided with inwardly directed lugs (47), (see Figure (6)), that are arranged to engage with the ends of a cross pin (48) in the trip arm (33) to hold such trip arm when the trap is set. A hook (49) upon which bait may be placed, is preferably provided on the inside of the bait shield (42).

In setting the trap, the wing nut (8) is screwed downwardly on the post (7) thus forcing the spider (15) and disk (10) together and causing the jaws (17) to be spread apart as shown in Figure (1). As the lower ends of the jaw members move apart, the upper ends (22) of the jaw members that control the setting of the trap will approach each other so that when the jaws are fully open the hook (27) will hook over the roller (30), after which the hook (34) on the bottom end of the trip arm (33) may be placed in engagement with the lug (35) on the trip member (36) and may be held in the engaged position while the wing nut is carefully unscrewed enough to permit the force of the spring (14) to be exerted on the arm (25), which in turn exerts a force that tends to move the bottom end of the trip arm (33) outwardly and thus causes the hook (34) to press against the lug (35) firmly enough so that it will stand in this position, unless it is disturbed, after the set and trip mechanism is engaged in this manner, the hands may be removed from the jaws of the trap and the wing nut turned upwardly on the post (7) into a position as shown in Figure (1), thereby leaving the trap unrestrained, except by the set and trip mechanism so that when the trip member (36) is disturbed the hook (34) will be released from the lug (35), thereby permitting the roller (30) to turn enough to release the hook (27) and permit the jaws of the trap to spring shut. The hook (34) on the end of the trip arm engages the lug (35) very lightly so that the slightest movement of the trip member (36) will release the same.

When the bait holding attachment shown in Figures (5) and (6) is used, the operation of setting the trap is the same as hereinbefore described, except that the lugs (47) on the bait holding device are caused to engage with the cross pin 48, so that any movement that tends to disturb the bait holding device will release the trip arm (33).

When this trap is to be used for catching moles, the jaws are opened by screwing the wing nut (8) down and are then inserted in the ground in such a way that the mole in following his usual course will be liable to pass under the trap. The set and trip mechanism is then properly engaged and the wing nut moved upwardly on the post (7), so that when the mole works under the trap and in doing so crowds earth up against the trip member (36), the trap will be sprung and the mole caught.

The inner edges of the jaw members may be made uneven as shown at 50 so that they will hold an animal more firmly but such edges will not be sharp enough to injure the skin of fur bearing animals. The trap will ordinarily catch the animal by the head, so that if the spring (14) is strong enough, the jaws (17) will be snapped together forcibly enough so that they will ordinarily kill a small animal, as a mole or rat, instantly.

The bait shield (42) makes it necessary for the animal to approach from the front of said shield to get at the bait, thereby insuring that the animal will be properly within the jaws (17) before the trap is sprung.

The trap may be made in various sizes, depending upon the use for which it is intended and may be used either by inserting the jaw members in the ground, or permitting such jaw members to rest upon a floor, or by suspending the trap in the air. The trap may also be placed in the water where it may be used for catching fish if desired.

The trap is strong and simple in construction, reliable in operation, easy to set, not liable to get out of order and not expensive to manufacture.

The arrangement of the links (13), jaws (17) and spring (14) is such as to cause the jaws to snap together very quickly when the trip mechanism is released, thereby insuring that an animal that is within the jaws at the time the trap is tripped can not escape.

The foregoing description taken in connection with the accompanying drawings clearly illustrates the principles of construction and method of operation of this trap, but it will be understood that changes in the form, dimensions and arrangements of the various parts of such trap may be resorted to within the scope of the following claims.

What we claim is:

1. A trap of the class described comprising a post, a spider slidable on said post, jaw members pivoted to said spider, two of said jaw members having diametrically opposite upwardly projecting ends, a plate secured to the bottom end of said post, links pivotally connecting said plate and said jaw members for swinging said jaw members toward and away from the central axis of said post when said spider is moved on said post, a compression spring on said post between said spider and said plate, set means for connecting the upwardly projecting ends of said two jaw members to hold the lower ends of said jaw members in an open position, and easily releasable trip devices for holding said set means.

2. A trap embodying a post, laterally projecting means rigid with the bottom end of said post, a spider slidable on said post, a compression spring interposed between said spider and said laterally projecting means to urge the same apart, a plurality of jaw members pivoted to said spider, the upper ends of two of said jaw members projecting above said spider, links pivotally connecting said jaw members and said laterally projecting means and arranged to expand said jaw members when said laterally projecting means and said spider are moved toward each other and to contract said jaw members when said laterally projecting means and said spider are moved apart, a set arm for releasably connecting the upwardly projecting ends of said two jaw members and trip means operable from beneath the lower end of said post for releasing said set arm.

3. A trap of the class described, comprising a post, a spider slidable on said post, jaw members pivoted to said spider, two of said jaw members having diametrically opposite upwardly projecting ends, a plate secured to the bottom end of said post, links pivotally connecting said plate and said jaw members for swinging said jaw members toward and away from the central axis of said post, a helical compression spring on said post between said spider and said plate, a set arm pivoted to the upwardly projecting end of one of said jaw members, a roller member pivotally mounted in the upwardly projecting end of the opposite jaw member, a hook on said set arm arranged to hook over said roller and extending downwardly therefrom, a trip member hinged to the plate on the bottom end of said post and easily releasable means for connecting the bottom end of said trip arm with said trip member.

In witness whereof, we hereunto subscribe our names this 16th day of July, A. D. 1921.

GEORGE FRIESS.
ROBERT NASS.